United States Patent
Zheng et al.

(10) Patent No.: US 10,783,469 B2
(45) Date of Patent: Sep. 22, 2020

(54) PRODUCTION SUPPORT SYSTEM USING MULTIPLE PLAN CANDIDATES AND DIFFERENT TYPES OF LEARNING DEVICES

(71) Applicant: HITACHI, LTD., Tokyo (JP)

(72) Inventors: Jian Zheng, Tokyo (JP); Yasuharu Namba, Tokyo (JP); Yuichi Kobayashi, Tokyo (JP); Yoshiyasu Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 213 days.

(21) Appl. No.: 15/795,521

(22) Filed: Oct. 27, 2017

(65) Prior Publication Data
US 2018/0121850 A1 May 3, 2018

(30) Foreign Application Priority Data

Nov. 1, 2016 (JP) .................................. 2016-214551
Jul. 20, 2017 (JP) .................................. 2017-141310

(51) Int. Cl.
*G06Q 10/06* (2012.01)
*G06Q 10/04* (2012.01)
(Continued)

(52) U.S. Cl.
CPC .... *G06Q 10/06313* (2013.01); *G05B 19/41865* (2013.01); *G06Q 10/04* (2013.01);
(Continued)

(58) Field of Classification Search
CPC ............. G06Q 10/06313; G06Q 10/04; G06Q 10/06315; G06Q 10/08; G06Q 10/0631; G05B 19/41865
See application file for complete search history.

(56) References Cited

U.S. PATENT DOCUMENTS 5,233,533 A * 8/1993 Edstrom ................ G06Q 10/06
700/103
2003/0158768 A1 8/2003 Maeda
(Continued)

FOREIGN PATENT DOCUMENTS

| JP | 2004-145436 A | 5/2004 |
| JP | 2012-194712 A | 10/2012 |
| WO | 2005/020044 A1 | 3/2005 |

OTHER PUBLICATIONS dictionary.com, Definition of Ideal at dictionary.com, obtained from dictionary.com on Jun. 17, 2019, < URL: https://www.dictionary.com/browse/ideals > (Year: 2019).*

(Continued)

Primary Examiner — Robert E Fennema
Assistant Examiner — Jonathan Michael Skrzycki
(74) Attorney, Agent, or Firm — Mattingly & Malur, PC

(57) ABSTRACT

In a production support system, process knowledge information is updated using machine learning on the basis of implementable process information, and implementable process information is output as a production plan of a product. Accordingly, production can be carried out considering factors, such as restart cost of facilities used in each of processes, for which skilled experience and knowledge are required with respect to the production of the product, and therefore the product can be produced effectively with low cost. Further, even when limitation conditions such as production capacity or quantity of a product exist for each of processes, suitable production can be carried out that satisfies these limitation conditions.

14 Claims, 15 Drawing Sheets

(51) Int. Cl.
   *G05B 19/418* (2006.01)
   *G06Q 10/08* (2012.01)
(52) U.S. Cl.
   CPC ....... *G06Q 10/06315* (2013.01); *G06Q 10/08* (2013.01); *G06Q 10/0631* (2013.01)

(56) References Cited

U.S. PATENT DOCUMENTS

2005/0216324 A1\* 9/2005 Maithell ................ G06Q 10/06
                                                    705/7.22
2010/0010845 A1\* 1/2010 Kuhn ..................... G06Q 10/00
                                                    705/7.36

OTHER PUBLICATIONS

Extended European Search Report received in corresponding European Application No. 17198970.0 dated Feb. 6, 2018.

\* cited by examiner

ORDER INFORMATION DB

| ORDER NUMBER | DELIVERY TIME | QUANTITY | PRODUCT KIND |
|---|---|---|---|
| 1 | 4 | 3 | A |
| 2 | 3 | 3 | B |
| 3 | 4 | 6 | A |
| 4 | 5 | 4 | A |
| 5 | 2 | 5 | B |
| 6 | 7 | 4 | B |

FIG. 8

LIMITATION CONDITION DB

| PROCESS NUMBER | DETERMINATION PARAMETER | | | LIMITATION CONDITION |
|---|---|---|---|---|
| 1 | DELIVERY TIME | QUANTITY | PRODUCT KIND | DELIVERY TIME > 5 |
| | | | | QUANTITY < 20 T |
| | | | | CONTINUOUS MANUFACTURING AMOUNT OF THE SAME KIND < 10 T |
| 2 | DELIVERY TIME | QUANTITY | PRODUCT KIND | DELIVERY TIME > 3 |
| | | | | QUANTITY < 30 T |
| | | | | CONTINUOUS MANUFACTURING AMOUNT OF THE SAME KIND < 10 T |

FIG. 9

EXECUTION PLAN DB

| PROCESS NUMBER (903) | ADOPTED PLAN CANDIDATE NUMBER (901) | GAP FROM IDEAL PLAN (902) | MANUFACTURING SEQUENCE (904) | ORDER NUMBER (905) | DELIVERY TIME (906) | QUANTITY (907) | PRODUCT KIND (908) |
|---|---|---|---|---|---|---|---|
| 1 | I | 10 | 1 | 2 | 3 | 3 | B |
|   |   |   | 2 | 5 | 6 | 5 | B |
|   |   |   | 3 | 6 | 7 | 4 | B |
|   |   |   | 4 | 1 | 4 | 3 | A |
|   |   |   | 5 | 3 | 4 | 6 | A |
| ... | ... | ... | ... | ... | ... | ... | ... |
| N | J | 30 | 2 | 5 | 2 | 3 | A |
|   |   |   | 3 | 4 | 5 | 4 | B |
|   |   |   | 4 | 2 | 3 | 5 | A |
|   |   |   | 5 | 6 | 3 | 5 | B |
|   |   |   | 6 |   | 7 | 4 | B |

FIG. 12

PRODUCTION SUPPORT SYSTEM USING MULTIPLE PLAN CANDIDATES AND DIFFERENT TYPES OF LEARNING DEVICES

CROSS-REFERENCE TO RELATED APPLICATIONS

The present application claims priorities pursuant to 35 U.S.C. § 119 from Japanese patent application no. 2016-214551 filed on Nov. 1, 2016 and Japanese patent application no. 2017-141310 filed on Jul. 20, 2017, the entire disclosure of which is hereby incorporated herein by reference.

BACKGROUND

Technical Field

The present invention relates to a production support system.

Related Art

In Japanese Patent Application Laid-Open Publication No. 2004-145436 (Patent Literature 1), there is disclosed a planning method for reducing an in-process inventory as a technology relating to a production plan in manufacturing industries. That is, in Patent Literature 1, there is described "Methods of production plan creation and apparatuses thereof in the past have had such a problem that an in-process inventory is generated at the end of a process because information on surface alignment in a post-process is not considered. Accordingly, a planning method that makes it possible to supply a plurality of substrates that is necessary for the unit in the post-process at the same time with surface alignment just before the production in a post-process, with a minimum in-process inventory."

Further, in Japanese Patent Application Laid-Open Publication No. 2012-194712 (Patent Literature 2), there is described a method of creating a production plan using an empirical rule database belonging to an operator. That is, in Patent Literature 2, there is disclosed "a production plan creation method, in which production lots being allocation candidates are ranked and output on the basis of a third evaluated value being an evaluation result of an allocation of an allocation candidate production lot and an allocation candidate production line, the third evaluated value being obtained from a first evaluated value obtained by evaluating a production lot to be an allocation candidate for each of evaluation items of production condition information of the production lot on the basis of an empirical rule database built via a selection result of past allocation candidates and a second evaluated value being a prediction result of a production result obtained by implementing production plan simulations about production lots to be allocation candidates in respective production lines in a descending order of the first evaluated values, and a specific production lot among the ranked and output allocation candidates is allocated to the production line, and learning is carried out on the basis of the specific production lot to update the empirical rule database."

SUMMARY OF THE INVENTION

However, in many manufacturing industries, when a production plan is created, such an empirical factor as considering restart costs of machines (facilities) is also required. That is, starting of machines used in respective processes requires considerable costs and time and, with respect to the factor, optimum starting conditions (number of starting and starting time) are to be known via the experience of an operator. However, it is difficult to describe the factor on the basis of a clear rule, and therefore these factors cannot be taken into consideration in the method of Patent Literature 1.

On the other hand, in Patent Literature 2, a plan is created using an empirical rule database belonging to an operator, and, in a case where a plurality of processes exists in production, there are limitation conditions in respective processes, and therefore all these limitation conditions must be satisfied. However, the planning method in Patent Literature 2 does not consider limitation conditions, and therefore cannot be applied to a plan of production configured from a plurality of processes.

The present invention has been made on the basis of the background, and provides a production support system for suitably producing a product to be produced via a plurality of processes.

An aspect of the present invention for solving the aforementioned problem is a production support system that includes a processor and a memory, and supports production of a product to be produced by implementing a plurality of processes, the system comprising an ideal plan creation unit configured to create an ideal plan of the respective processes in a first process order based on a process knowledge information being a relationship between the product and an implementation time of the respective processes and on a predetermined indicator, a plan candidate planning unit configured to create a plurality of the plan candidates in the respective processes in an order opposite to the first process order based on a limitation condition being a limitation or condition which imposes on the respective processes, a plan candidate selection unit configured to calculate similarity between the ideal plan and each of the plurality of the plan candidates and to select the plan candidate having a high similarity to the ideal plan as an implementation plan, and a learning unit configured to reflect the selected implementation plan on the process knowledge information.

Problems, configurations, and effects other than those mentioned above will be apparent via following description of the embodiments.

According to the present invention, it is possible to suitably produce a product to be produced via a plurality of processes.

BRIEF DESCRIPTION OF THE DRAWINGS

FIG. 8 illustrates an exemplary order information DB 101;

FIG. 9 illustrates an exemplary limitation condition DB 102;

FIG. 12 illustrates an exemplary execution plan DB 111;

DETAILED DESCRIPTION OF THE INVENTION

Hereinafter, embodiments for carrying out the present invention will be described, with reference to drawings.
<System Configuration>

First, a system configuration will be described.

Figure 1:
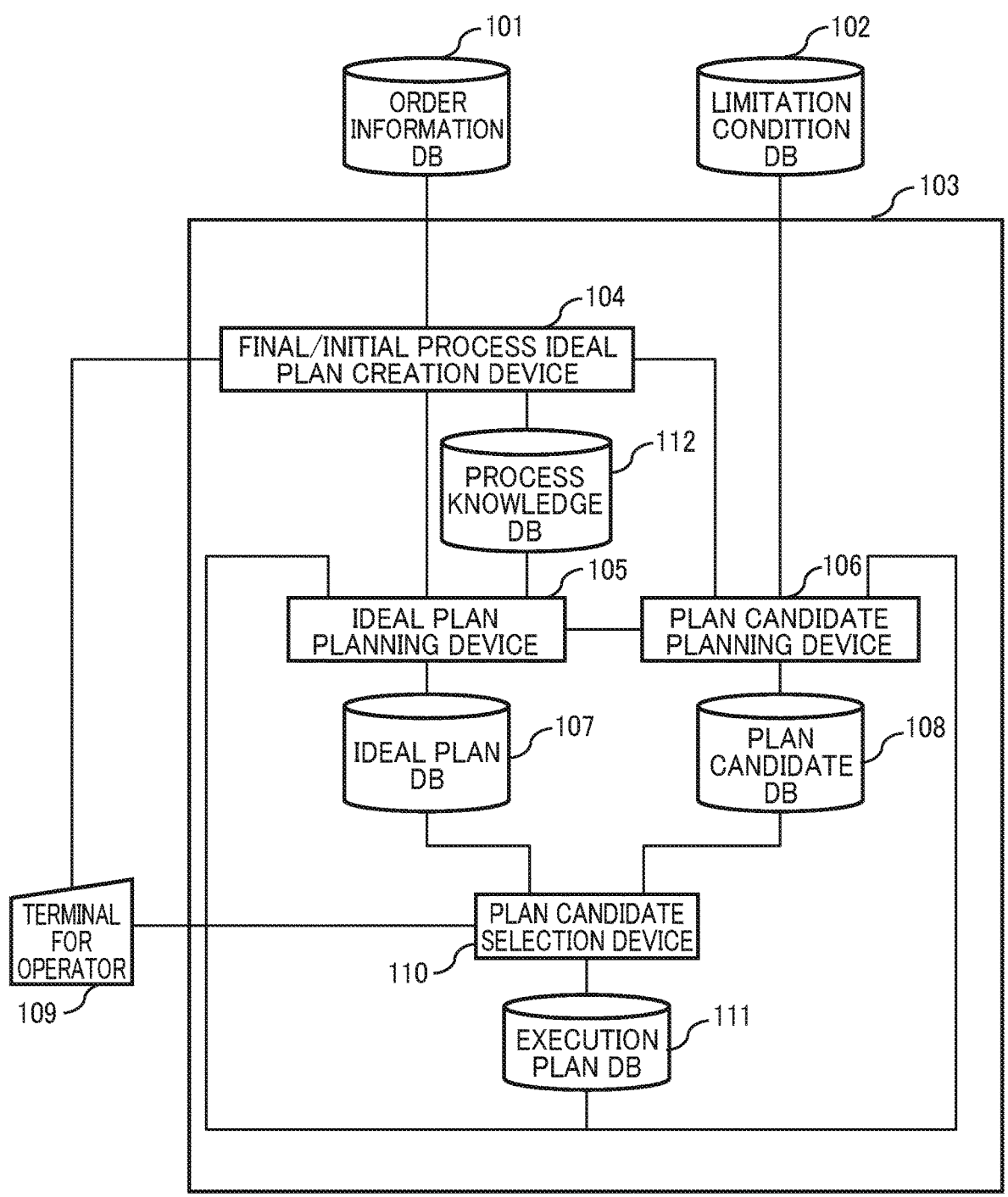
FIG. 1 illustrates an exemplary configuration of the production support system according to the present embodiment.

FIG. 1 illustrates an exemplary configuration of the production support system according to the present embodiment. As illustrated in FIG. 1, a production support system 1 is an information processing system that supports production of a product to be produced by implementing a plurality of processes, and is configured to include a terminal 109 for operator and an automatic planning system 103. Meanwhile, in what follows, a process to be implemented first in production of the product (the most upstream process) is called the initial process, and a process to be implemented last in production of a product (the most downstream process) is called the final process.

The automatic planning system 103 is configured to include respective information processors (computers) of a final/initial process ideal plan creation device 104, an ideal plan planning device 105, a plan candidate planning device 106 and a plan candidate selection device 110. Further, the automatic planning system 103 includes respective databases of a process knowledge DB 112, an ideal plan DB 107, a plan candidate DB 108 and an execution plan DB 111 (DB: database, the same hereinafter).

The final/initial process ideal plan creation device 104 and the ideal plan planning device 105 calculate information on an implementation time of each of processes to be implemented for producing a product (for example, information on a sequence of introduction of an order lot to facilities in each of processes, hereinafter, such information will be called an ideal plan).

The ideal plan is a production plan of products, for example, that determines, when an order of production of a plurality of products (lots) is received, how each of facilities used for each of processes is caused to accept what lot via what sequence (time zone) and to work.

Concretely, the final/initial process ideal plan creation device 104 specifies a process that carries out first calculation of the implementation time (hereinafter, referred to as final/initial process, or calculation start process), and generates information on implementation time of the final/initial process (hereinafter, referred to as final/initial process ideal plan, or calculation start process information. Details will be described later.), on the basis of the specified final/initial process and information on an order of a product obtained from the terminal 109 for operator (hereinafter, referred to as order information. Details will be described later). Then, the ideal plan planning device 105 generates an ideal plan on the basis of the final/initial process ideal plan generated by the final/initial process ideal plan creation device 104.

The plan candidate planning device 106 generates a plurality of information on the implementation time of each of processes (hereinafter, referred to as plan candidate. Details will be described later.), satisfying designated conditions (conditions to be specified by limitation condition information to be described later).

The plan candidate is a practical production plan of a product determining that, for example in the aforementioned example, each of facilities is caused to accept what lot via what sequence (time zone) and to work after satisfying operational and technical restrictions on each of facilities used in each of processes.

The plan candidate selection device 110 specifies a predetermined number (for example, one) of plan candidates among the generated plurality of plan candidates. Meanwhile, hereinafter, the specified plan candidate will be called an execution plan.

The process knowledge DB 112 (hereinafter, also referred to as process knowledge information storing unit) is a knowledge database for creating the ideal plan, and concretely, stores process knowledge information that means a relationship between a product and the implementation time in each of processes to be implemented for the production of the product. In process knowledge information, as will be described later, the information is updated by machine learning or the like.

An order information DB 101 stores order information that is necessary for calculating the ideal plan. The order information includes, for example, an order of a product to be produced and past order histories of the product. Further, the order information includes, for example, information such as a product kind, a quantity and a delivery time of a product asked from a customer.

A limitation condition DB 102 stores limitation condition the information that is information on conditions set for each of processes. The limitation condition information includes, for example, information on manufacturing capacity of a product in each of processes, a specification of the product to be produced, difference between a specification of a product in each of processes and specifications of products in preceding and succeeding processes of the process and the like. Further, the limitation condition information includes information, for example, on a delivery time of the product or a quantity of the product.

The ideal plan DB 107 stores the ideal plan for each of processes. Further, the plan candidate DB 108 stores plan candidates for each of processes. The execution plan DB 111 stores execution plans.

Meanwhile, in the present embodiment, respective DBs shall be configured by information processors such as general PCs (PC: Personal Computer) and general database software. By means of these, a search function and an update function are provided.

(Hardware Configuration)

Next, there will be described a hardware configuration of each of information processors configuring the production support system 1.

Figure 2:
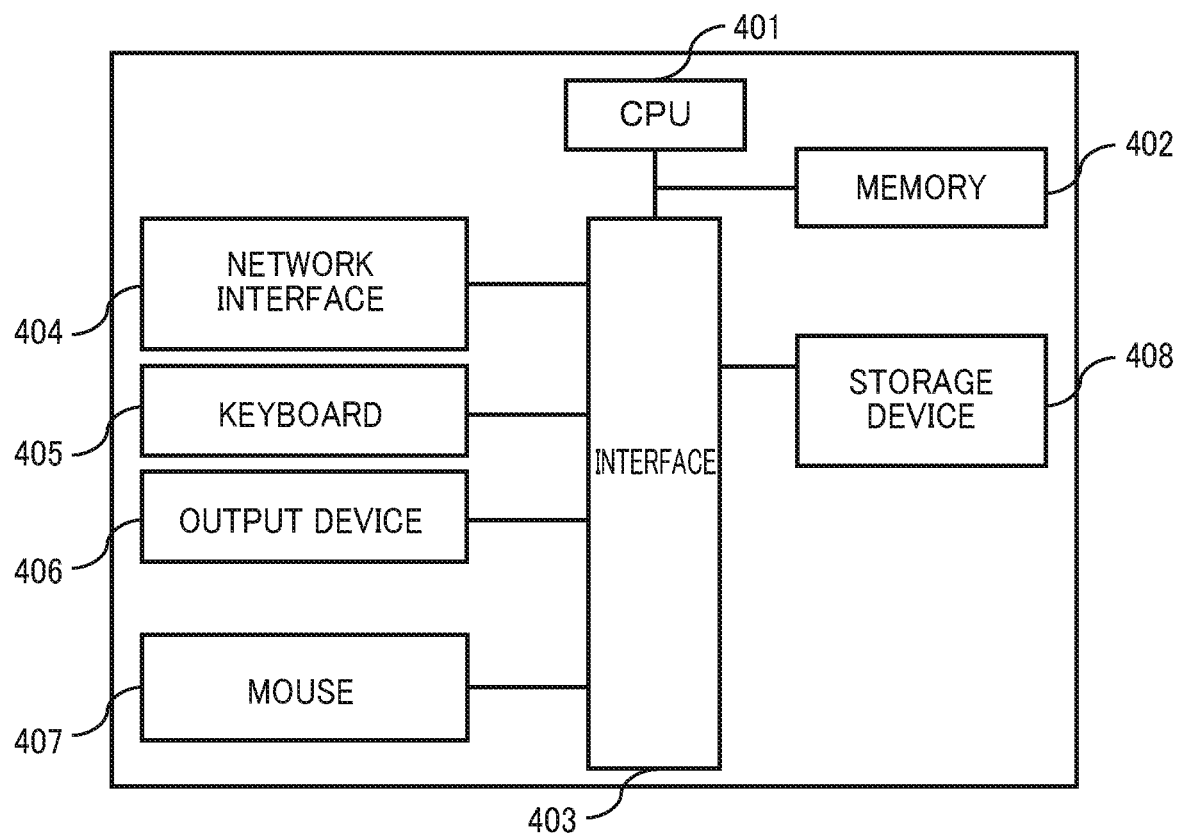
FIG. 2 illustrates an exemplary hardware configuration of each of information processers that configures a production support system 1.

FIG. 2 illustrates an exemplary hardware configuration of each of information processors that configures the production support system 1. As illustrated in FIG. 2, each of information processors is equipped with a CPU 401, a memory 402, an interface 403, a network interface 404, a keyboard 405, an output device 406, a mouse 407 and a storage device 408.

The CPU 401 is, for example, a central processing unit and is a processor capable of executing a program that is recorded in the memory 402 or has previously been transferred to the memory 402 from the storage device 408. Meanwhile, programs may be introduced by a detachable storage medium, according to need. In this case, a device for reading the storage medium is connected to the interface 403. Examples of devices for reading the storage medium include optical discs (such as CD, DVD and blue ray disc) and flash memory, as usable devices. Further, a program may be introduced into each of information processors by means of the network interface 404 via a communication medium (such as a communication line or carrier waves on a communication line), according to need.

The memory 402 temporarily records programs or data. The interface 403 is a device that connects storage media and the like. The network interface 404 is a device for conducting communication with another information processor.

The keyboard 405 receives input of information. The output device 406 is a monitor or the like and outputs various information. The mouse 407 designates a position on a screen and informs the CPU 401 of instructions on prescribed processing, by changing a position of a pointer output to the output device 406 and receiving input to a button equipped for the mouse 407. Meanwhile, the mouse 407 may be replaced, for example, with a touch panel. In this case, functions with respect to the pointer may be omitted.

The storage device 408 stores programs or data. The storage device 408 is configured, for example, by a magnetic disc, nonvolatile memory (for example, a hard disc, solid state drive (SSD)) or the like. In this case, programs or data stored in the storage device 408 is preserved, for example, even in a case where the power source of the storage device 408 is turned OFF and then turned ON. Meanwhile, into the storage device 408, an operating system (OS) may previously have been introduced. Consequently, a program can be designated using a file name. Here, an OS means basic software of a computer and a generally broadly known OS can be used. In the present embodiment, it is supposed that the OS has been introduced.

(Function)

Next, functions provided for each of information processors will be described.

Figure 3:
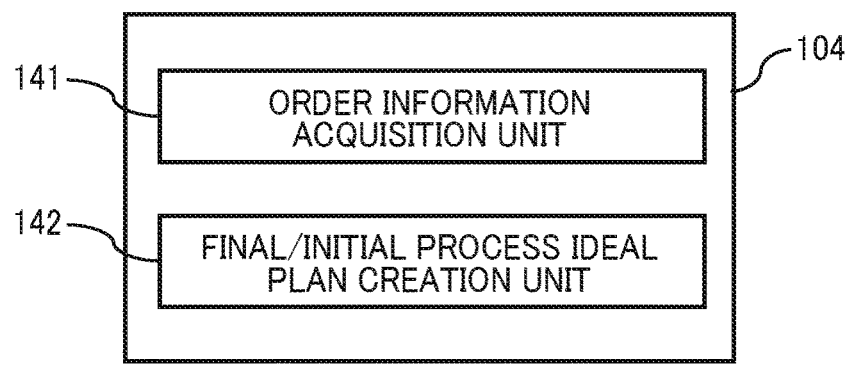
FIG. 3 illustrates an exemplary function provided for a final/initial process ideal plan creation device 104.

FIG. 3 illustrates an exemplary function provided for the final/initial process ideal plan creation device 104. As illustrated in FIG. 3, the final/initial process ideal plan creation device 104 is equipped with an order information acquisition unit 141 and a final/initial process ideal plan creation unit 142. The order information acquisition unit 141 acquires information on a product to be produced (order information). The final/initial process ideal plan creation unit 142 generates a final/initial process ideal plan (calculation start process information).

Figure 4:
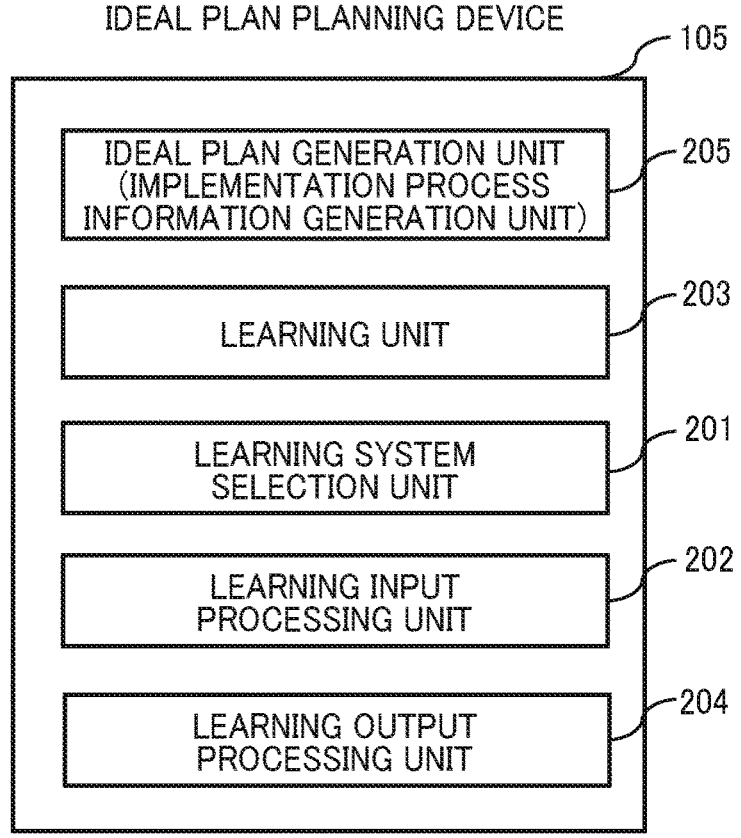
FIG. 4 illustrates an exemplary function provided for an ideal plan planning device 105.

FIG. 4 illustrates an exemplary function provided for the ideal plan planning device 105. As illustrated in FIG. 4, the ideal plan planning device 105 is equipped with an ideal plan generation unit 205, a learning system selection unit 201, a learning input processing unit 202, a learning unit 203 and a learning output processing unit 204.

The ideal plan generation unit 205 (hereinafter, also referred to as an implementation process information generation unit) generates, on the basis of the information on a product acquired by the order information acquisition unit 141 and the process knowledge information, implementation process information (ideal plan) on the implementation time of each of processes implemented for producing the product whose information has been acquired by the order information acquisition unit 141.

Concretely, for example, the implementation process information generation unit generates, on the basis of information on the process having been prescribed, information specifying the implementation time of a preceding process of the prescribed process, to thereby generate the implementation process information. Hereinafter, the generation system of information on processes is referred to as a forward system.

Further, for example, the implementation process information generation unit generates, on the basis of information on the process having been prescribed, information specifying the implementation time of a succeeding process of the prescribed process. Hereinafter, the generation system of information on processes is referred to as a backward system.

Further, an implementation process information calculation unit acquires an indicator when the implementation process information is to be generated, and generates the implementation process information according to the indicator having been acquired. Meanwhile, the indicator means, for example, information on a quantity of a product, a production completion time of the product (for example, a delivery time), or the like.

The learning unit 203 updates (learns) the process knowledge information on the basis of implementable implementation process information generated by an implementable process information generation unit to be described later. The learning unit 203 is configured to include a learning model that is built using a machine learning technology such as a neural network.

The learning unit 203 is a learning device that outputs, when the device receives input of information on a product and implementation process thereof, information on a production process of the product, which is similar to a pattern having been carried out in the past. In the present embodiment, the learning unit 203 is equipped with two types of learning devices. A first learning device (hereinafter, referred to as a learning device that works in a backward direction) is a learning device based on the backward system in which a post-process is set as input and a pre-process is set as output. On the other hand, a second learning device (hereinafter, referred to as a learning device that works in a forward direction) is a learning device based on the forward system in which a pre-process is set as input and a post-process is set as output.

Concretely, the learning unit updates the process knowledge information by generating, on the basis of information on the process having been prescribed, information that specifies an implementation time of a preceding process of the prescribed process, or updates the process knowledge information by generating, on the basis of information on the process having been prescribed, information that specifies an implementation time of a process to be implemented after the prescribed process.

The learning system selection unit 201 receives the selection of a learning device that works in the forward direction or a learning device that works in the backward direction. That is, the learning system selection unit 201 is a processing unit that selects whether a production process of a product is to be learned going up from the final process, or a production process of a product is to be learned from the initial process toward the post-process.

The learning input processing unit 202 inputs information to the learning unit 203. The learning output processing unit 204 outputs information having been learned (updated) by the learning unit 203.

Figure 5:
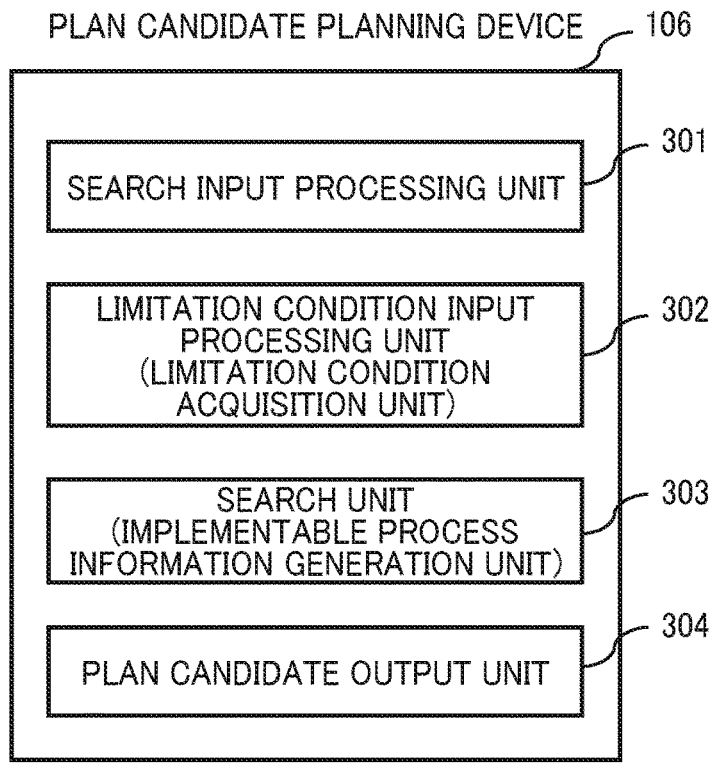
FIG. 5 illustrates an exemplary function provided for a plan candidate planning device 106.

FIG. 5 illustrates an exemplary function provided for the plan candidate planning device 106. As illustrated in FIG. 5, the plan candidate planning device 106 is equipped with a search input processing unit 301, a limitation condition input processing unit 302, a search unit 303 and a plan candidate output unit 304.

The search input processing unit 301 is a processing unit that reads an execution plan from the execution plan DB 111.

The limitation condition input processing unit 302 (hereinafter, also referred to as a limitation condition acquisition unit) acquires limitation condition information being information on conditions that are set for each of the processes from the limitation condition DB 102. For example, the limitation condition acquisition unit acquires information including information on usage conditions of facilities to be used in the process as the limitation condition information.

The search unit 303 (hereinafter, also referred to as an implementable process information generation unit) generates, on the basis of the limitation condition information acquired by the limitation condition acquisition unit, implementable process information (plan candidate) being information on the implementation time in each of processes in manufacturing of the product whose information has been acquired by the order information acquisition unit 141, satisfying the set conditions. That is, the search unit 303 is a processing unit that makes a plan of a plan candidate on the basis of limitation conditions for each of processes. The search unit 303 is configured to include a plan model that is built using a mathematical plan technology such as limitation programming. The plan model can search a plurality of plan candidates that satisfies limitation conditions.

For example, the implementable process information generation unit generates a plurality of the implementable process information satisfying the usage conditions of facilities as the implementable process information.

Further, the implementable process information generation unit generates a plurality of the implementable process information, calculates similarities between each of the generated implementable process information and the generated implementation process information respectively, and specifies the implementable process information that is the most similar to the implementation process information, on the basis of the similarities having been calculated.

The plan candidate output unit 304 outputs the implementable process information (plan candidate) generated by the search unit 303 to the plan candidate DB 108.

Figure 6:
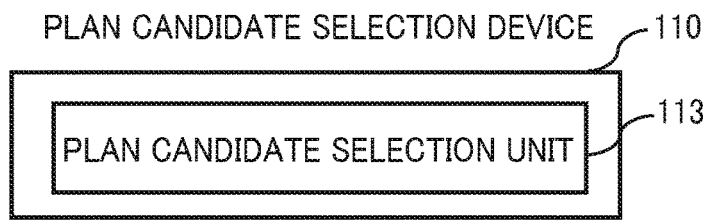
FIG. 6 illustrates an exemplary function provided for a plan candidate selection device 110.

FIG. 6 illustrates an exemplary function provided for the plan candidate selection device 110. As illustrated in FIG. 6, the plan candidate selection device 110 is equipped with a plan candidate selection unit 113. The plan candidate selection unit 113 specifies a prescribed number (for example, one) of plan candidates among a plurality of plan candidates generated by the search unit 303.

Figure 7:
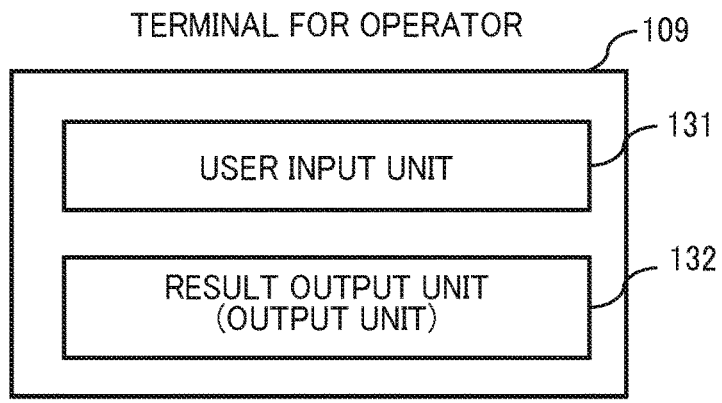
FIG. 7 illustrates an exemplary function provided for a terminal 109 for operator.

FIG. 7 illustrates an exemplary function provided for the terminal 109 for operator. The terminal 109 for operator is an information processor (computer) that is operated by a user (for example, an administer of the production support system 1, or a person taking part in production of a product, the same hereinafter). As illustrated in FIG. 7, the terminal 109 for operator is equipped with a user input unit 131 and a result output unit 132. The user input unit 131 receives input of various information such as order information.

The result output unit 132 (hereinafter, also referred to as an output unit) outputs the implementable process information generated by the implementable process information generation unit as the information of a production process of a product acquired by the order information acquisition unit 141. Concretely, the output unit outputs the implementable process information specified by the implementable process information generation unit as the information of a production process of a product acquired by the order information acquisition unit 141.

(Database)

Next, a database equipped for the production support system 1 will be described.

FIG. 8 illustrates the exemplary order information DB 101. As illustrated in FIG. 8, the order information DB 101 has at least one record including each of items of an order number 501, a delivery time 502, a quantity 503 and a product kind 504. In the order number 501, information that discriminates orders from customers and the like (hereinafter, referred to as an order number) is stored. In the delivery time 502, the time for delivering a product for the order of the order number 501 (for example, the deadline of delivery, hereinafter referred to as a delivery time) is stored. For example, in the delivery time 502, the number of days until shipping is stored. In the quantity 503, the number of the products designated by the order of the order number 501 (hereinafter, referred to as an order quantity) is stored. In the product kind 504, information specifying the type of the product designated by the order of the order number 501 (hereinafter, referred to as a product kind) is stored. Meanwhile, the order information DB 101 may contain other items necessary for producing the product, in addition to each of the items.

FIG. 9 illustrates the exemplary limitation condition DB 102. As illustrated in FIG. 9, the limitation condition DB 102 has at least one record containing each of items of a process number 601, a determination parameter 602 and a limitation condition 603. In the process number 601, numbers that discriminate each of processes (hereinafter, referred to as a process number) are stored. In the determination parameter 602, information on factors that determine conditions or limitations imposed on processes of the process number 601 (hereinafter, referred to as a determination parameter) is stored, and for example, information showing a delivery time of a product, an order quantity of a product or a kind of a product is stored. In the limitation condition 603, contents of conditions or limitations by factors of the determination parameter 602 (hereinafter, referred to as a limitation condition) are stored, and for example, conditions on the deadline of each of processes and conditions on facilities used in each of processes (information on starting cost and starting time of facilities such as machines) are stored. Meanwhile, the determination parameter 602 and the limitation condition 603 may contain information on the weather that affects production of a product.

Figure 10:
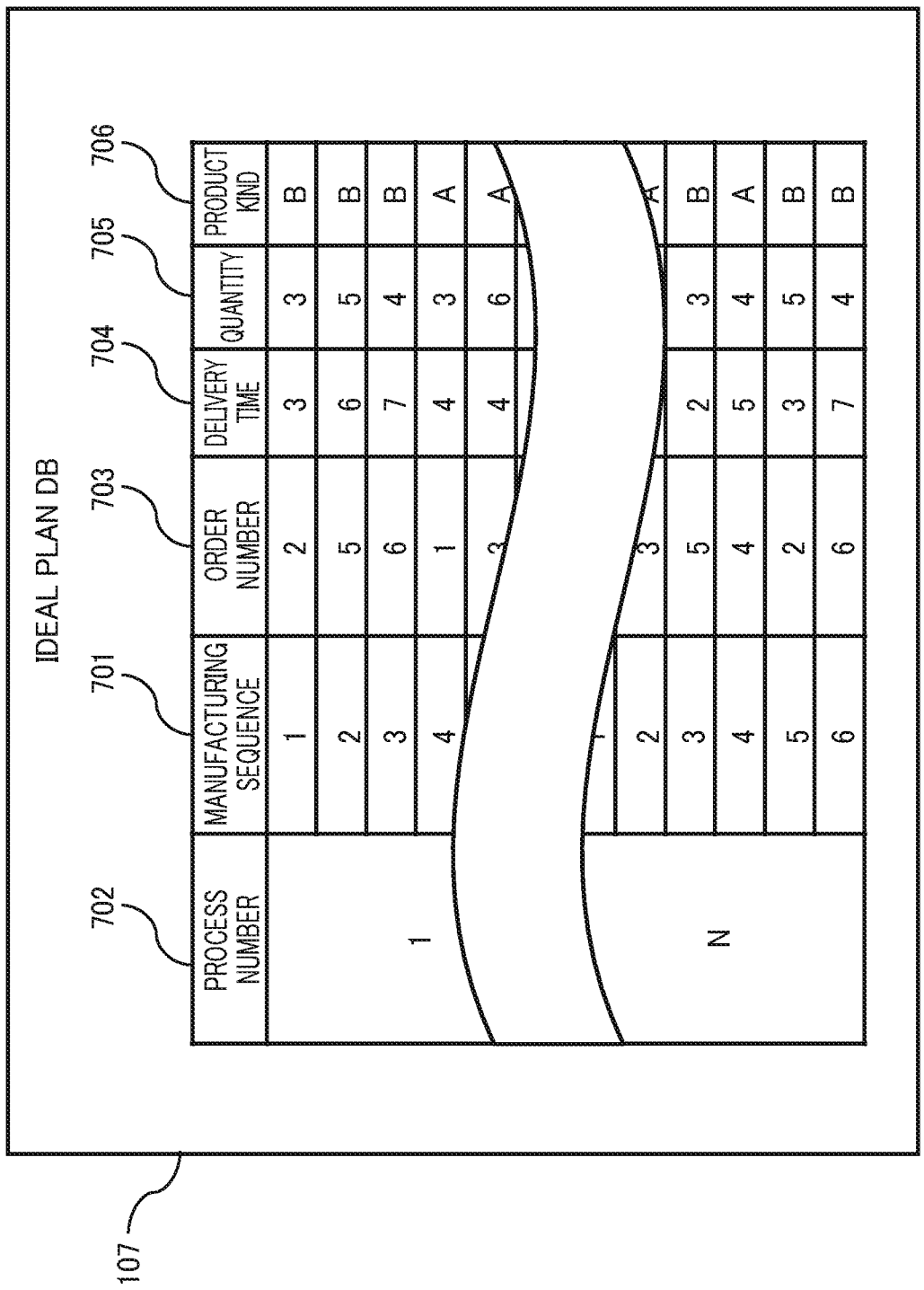
FIG. 10 illustrates an exemplary ideal plan DB 107.

FIG. 10 illustrates the exemplary ideal plan DB 107. As illustrated in FIG. 10, the ideal plan DB 107 has at least one record containing each of items of a process number 702, a manufacturing sequence 701, an order number 703, a delivery time 704, a quantity 705 and a product kind 706. Among these, the process number 702, the order number 703, the delivery time 704, the quantity 705 and the product kind 706 correspond to the process number 601 in the limitation condition DB 102, the order number 501 in the order information DB 101, the delivery time 502 in the order information DB 101, the quantity 503 in the order information DB 101, and the product kind 504 in the order information DB 101, respectively. In the manufacturing sequence 701, information (hereinafter, referred to as a manufacturing sequence number) that specifies a sequence of manufacturing a product carried out in the process of the process number 702 (manufacturing sequence of each product for the order) is stored. The manufacturing sequence number is a value showing the priority order of manufacturing.

Figure 11:
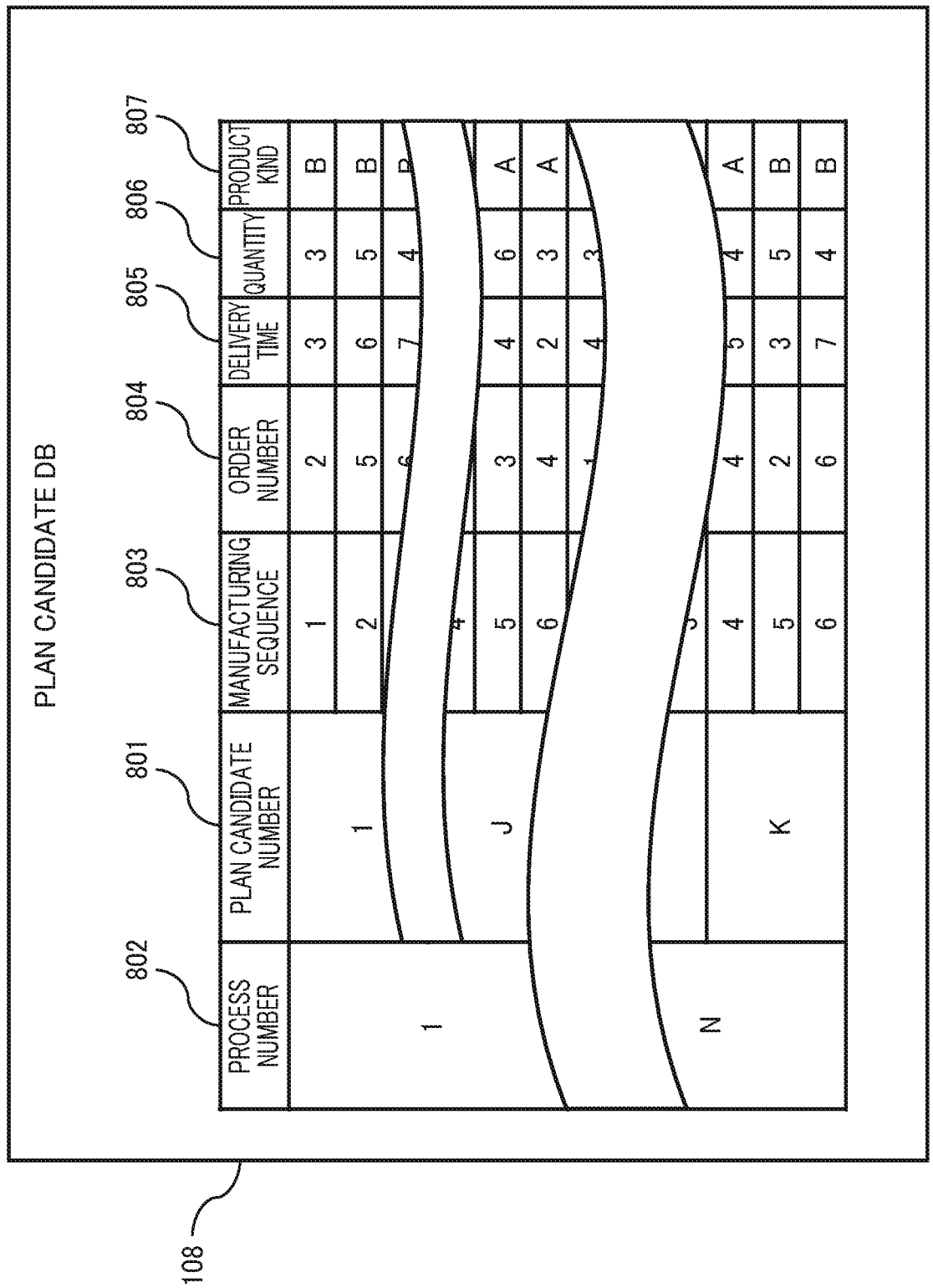
FIG. 11 illustrates an exemplary plan candidate DB 108.

FIG. 11 illustrates the exemplary plan candidate DB 108. As illustrated in FIG. 11, the plan candidate DB 108 has at least one record containing each of items of a process number 802, a plan candidate number 801, a manufacturing sequence 803, an order number 804, a delivery time 805, a quantity 806 and a product kind 807. Among these, the process number 802, the manufacturing sequence 803, the order number 804, the delivery time 805, the quantity 806 and the product kind 807 correspond to the process number 601 in the limitation condition DB 102, the manufacturing sequence 701 in the ideal plan DB 107, the order number 703 in the ideal plan DB 107, the delivery time 704 in the ideal plan DB 107, the quantity 705 in the ideal plan DB 107, and the product kind 706 in the ideal plan DB 107, respectively.

In the plan candidate number 801, information that discriminates plan candidates (hereinafter, plan candidate number) is stored.

FIG. 12 illustrates the exemplary execution plan DB 111. The execution plan DB 111 has at least one record containing each of items of a process number 903, an adopted plan candidate number 901, a gap from ideal plan 902, a manufacturing sequence 904, an order number 905, a delivery time 906, a quantity 907 and a product kind 908. Among these, the process number 903, the manufacturing sequence 904, the order number 905, the delivery time 906, the quantity 907 and the product kind 908 correspond to the process number 601 in the ideal plan DB 107, the manufacturing sequence 701 in the ideal plan DB 107, the order number 501 in the order information DB 101, the delivery time 502 in the order information DB 101, the quantity 503 in the order information DB 101 and the product kind 504 in the order information DB 101, respectively.

In the adopted plan candidate number 901, information that specifies an adopted plan candidate (that is, an execution plan) (hereinafter, referred to as an adopted plan candidate number) is stored. In the gap from ideal plan 902, information that shows the similarity between the adopted plan candidate and the ideal plan is stored. In the present embodiment, information showing the gap between both is stored. A calculation method of the gap will be described later.

The function of each of information processors as described above is actualized by hardware of each of information processors, or as the result that the CPU 401 (processor) of each of information processors reads out and executes the program stored in the memory 402 or in the storage device 408.

(Processing)

Next, processing that is carried out in the production support system 1 will be described.

Figure 13:
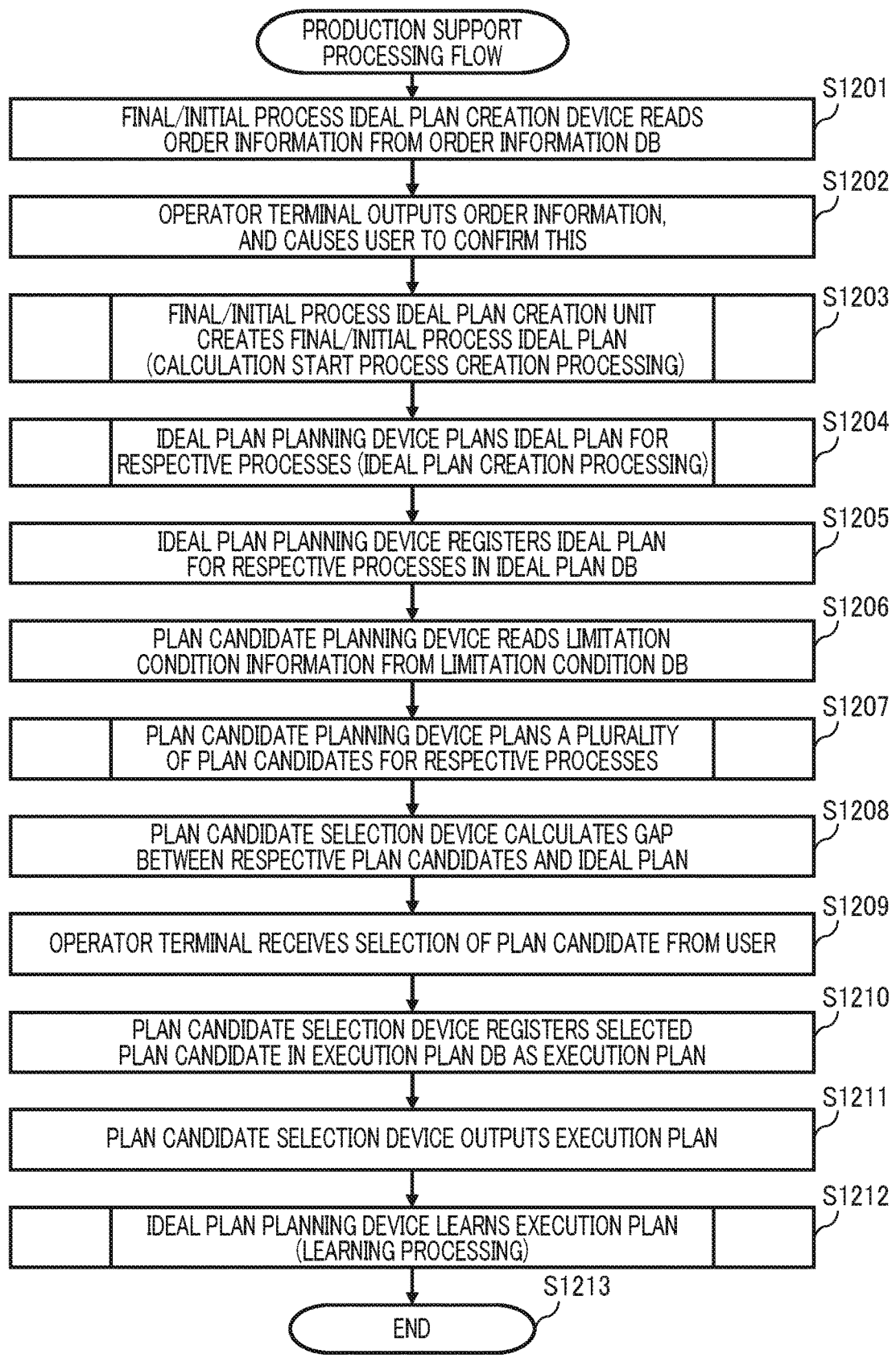
FIG. 13 illustrates a flow chart of production support processing.

FIG. 13 illustrates a flow chart that describes processing of generating an implementation plan of processes to be carried out for production of a product and carrying out the learning thereof (hereinafter, referred to as production support processing). The production support processing is started, for example, when a prescribed input is carried out for the terminal 109 for operator.

As illustrated in FIG. 13, first, the final/initial process ideal plan creation device 104 communicates with the order information DB 101 to thereby acquire order information having been input from the terminal 109 for operator (S1201). For example, the final/initial process ideal plan creation device 104 acquires order information with respect to orders having been made in a prescribed period (for example, orders for one week close to delivery time).

Then, the terminal 109 for operator acquires the order information acquired in S1201 from the final/initial process ideal plan creation device 104, and outputs the acquired order information (S1202). Consequently, it causes the user to confirm contents of the order information.

Meanwhile, the above-described communication is carried out by general communication, remote procedure call (RPC) or the like. Also hereinafter, communication between each of information processors and each of DBs shall be carried out by such a method.

Next, the final/initial process ideal plan creation device 104 generates a final/initial process ideal plan on the basis of the order information acquired in S1201 (S1203). Details of the processing (hereinafter, referred to as calculation start process information generation processing) will be described later.

Figure 14:
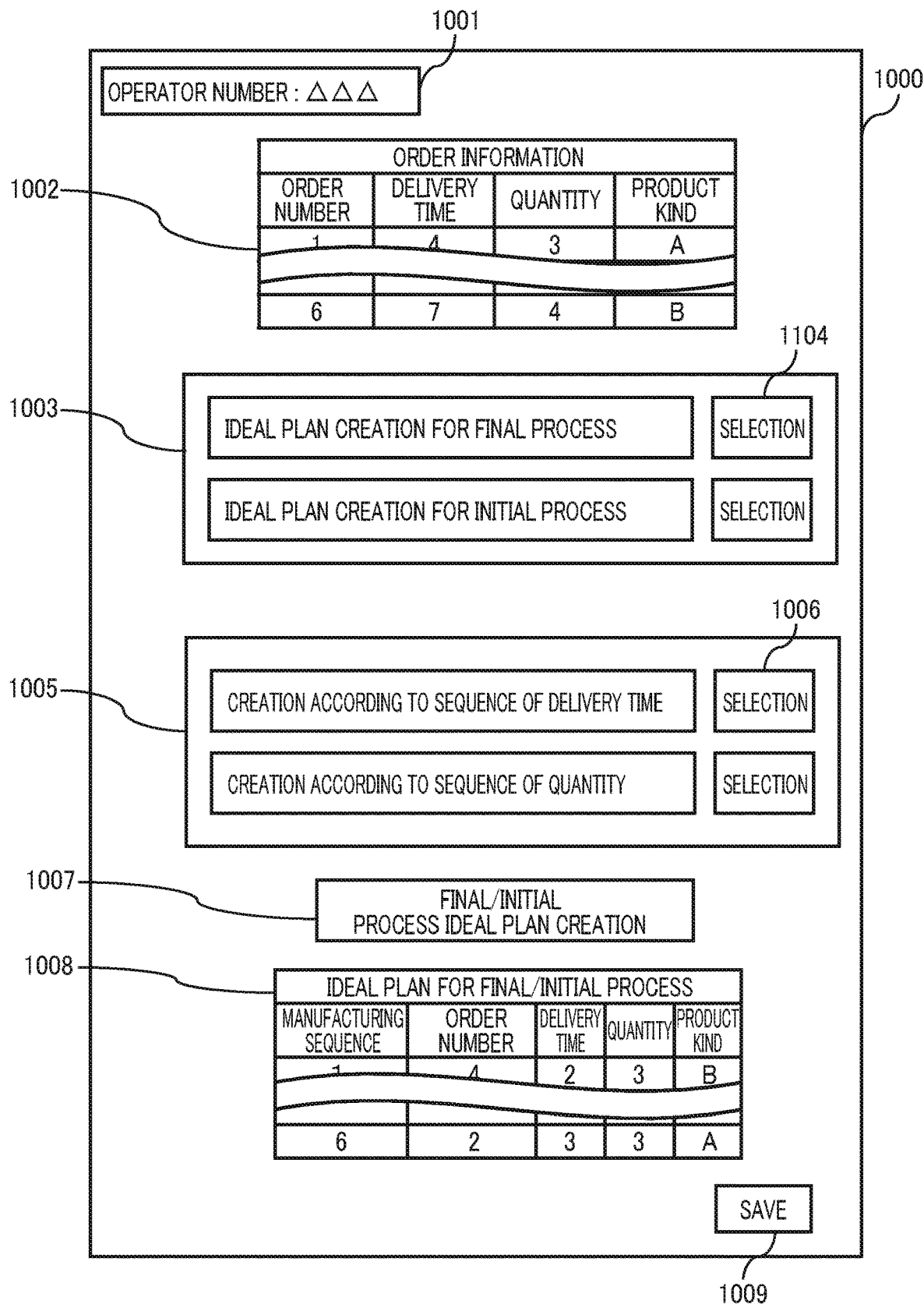
FIG. 14 illustrates an exemplary ideal plan generation support screen.

Then, the ideal plan planning device 105 generates an ideal plan for each of processes on the basis of the final/initial process ideal plan calculated in S1203 (S1204). Details of the processing (hereinafter, referred to as ideal plan creation processing) will be described later (FIG. 14). Further, the ideal plan planning device 105 registers the ideal plan generated in S1204 in the ideal plan DB 107 (S1205).

Further, the plan candidate planning device 106 acquires limitation condition information from the limitation condition DB 102 (S1206). Then, the plan candidate planning device 106 generates at least one plan candidate on the basis of the limitation condition information acquired in S1206 (S1207). Details of the processing (hereinafter, referred to as plan candidate planning processing) will be described later.

Next, the plan candidate selection device 110 calculates similarity between each of plan candidates created in S1207 and an ideal plan (S1208). In the present embodiment, in order to calculate the similarity, calculation of a gap is carried out. The calculation of a gap is carried out, for example, on the basis of mathematical formulae below.

$$D_i = (KN_i - LN_i)^2 + (KS_i - LS_i)^2 + (KH_i - LH_i)^2 \quad \text{[Formula 1]}$$

$$KH_i - LH_i = \begin{cases} 0 & \text{if } KH_i = LH_i \\ 1, & \text{otherwise} \end{cases} \quad \text{[Formula 2]}$$

$$D = \sum_{i=1}^{N} Di \quad \text{[Formula 3]}$$

Here, $KN_i$ and $LN_i$ are delivery time of the manufacturing sequence i in the plan candidate and the ideal plan, respectively, $KS_i$ and $LS_i$ are the quantity of order of manufacturing sequence i in the plan candidate and the ideal plan, respectively, and $KH_i$ and $LH_i$ are the product kind of order of manufacturing sequence i in the plan candidate and the ideal plan, respectively. Further, it is so determined that the difference between $KH_i$ and $LH_i$ is 0 in a case where $KH_i$ and $LH_i$ belong to the same product kind and the difference between $KH_i$ and $LH_i$ is 1 in a case where $KH_i$ and $LH_i$ belong to different product kinds. Furthermore, a gap D between the plan candidate and the ideal plan is the total sum of a gap $D_i$ of orders of manufacturing sequence i in the plan candidate and the ideal plan. Meanwhile, in the calculation of the gap between the plan candidate and the ideal plan, values obtained by multiplying each of parameters by a prescribed weighting value (weighted each of parameters) may be used, in place of each of the above-described parameters.

The terminal 109 for operator receives the selection of a plan candidate to be adopted among the plan candidate created in S1207 from a user (S1209). Meanwhile, in place of the selection of a plan candidate by a user, it is also possible to cause the plan candidate selection device 110 or the like to select automatically a plan candidate having the shortest gap from the ideal plan (a plan candidate having the highest similarity to the ideal plan).

The plan candidate selection device 110 registers the plan candidate selected in S1209 in the execution plan DB 111 as an execution plan (S1210). Further, the plan candidate selection device 110 outputs information with respect to the execution plan selected in S1209 (S1211).

Subsequently, the ideal plan planning device 105 learns execution plans for each of processes on the basis of the execution plan selected in S1209 (S1212). The detail of the processing (hereinafter, referred to as learning processing) will be described later. Thus, the production support processing finishes (S1213).

Here, an example of screens that are displayed in the production support processing will be described.

FIG. 14 illustrates an example of screens that are displayed when an ideal plan is calculated (hereinafter, referred to as an ideal plan generation support screen) among screens that are output to the terminal 109 for operator. The ideal plan generation support screen is, for example, displayed when a production support processing is started.

As illustrated in FIG. 14, an ideal plan generation support screen 1000 is equipped with each of columns of an operator number input box 1001, an order information display box 1002, a final/initial process ideal plan selection box 1003, a final/initial process ideal plan selection button 1004, an ideal plan creation indicator selection box 1005, an ideal plan creation indicator selection button 1006, a final/initial process ideal plan creation button 1007, a final/initial process ideal plan display box 1008 and a storage button 1009.

The operator number input box 1001 receives input of a personal number such as an employee number from a user. To the order information display box 1002, the order information acquired in S1201 is output.

The final/initial process ideal plan selection box 1003 and the final/initial process ideal plan selection button 1004 receive input that determines either a final process or an initial process is to be selected as a calculation start process. The ideal plan creation indicator selection box 1005 and the ideal plan creation indicator selection button 1006 receive the selection of indicators when an ideal plan is to be generated. For example, there are indicators for selecting whether an ideal plan is to be created so that a delivery time of a product is moved forward or an ideal plan is to be created so that the quantity of a product to be produced becomes larger.

The final/initial process ideal plan creation button 1007 receives the start of creation of an ideal plan on the basis of the selected calculation start process. The final/initial process ideal plan display box 1008 outputs contents of the created ideal plan. The save button 1009 receives an instruction for storage of the created ideal plan.

Figure 15:
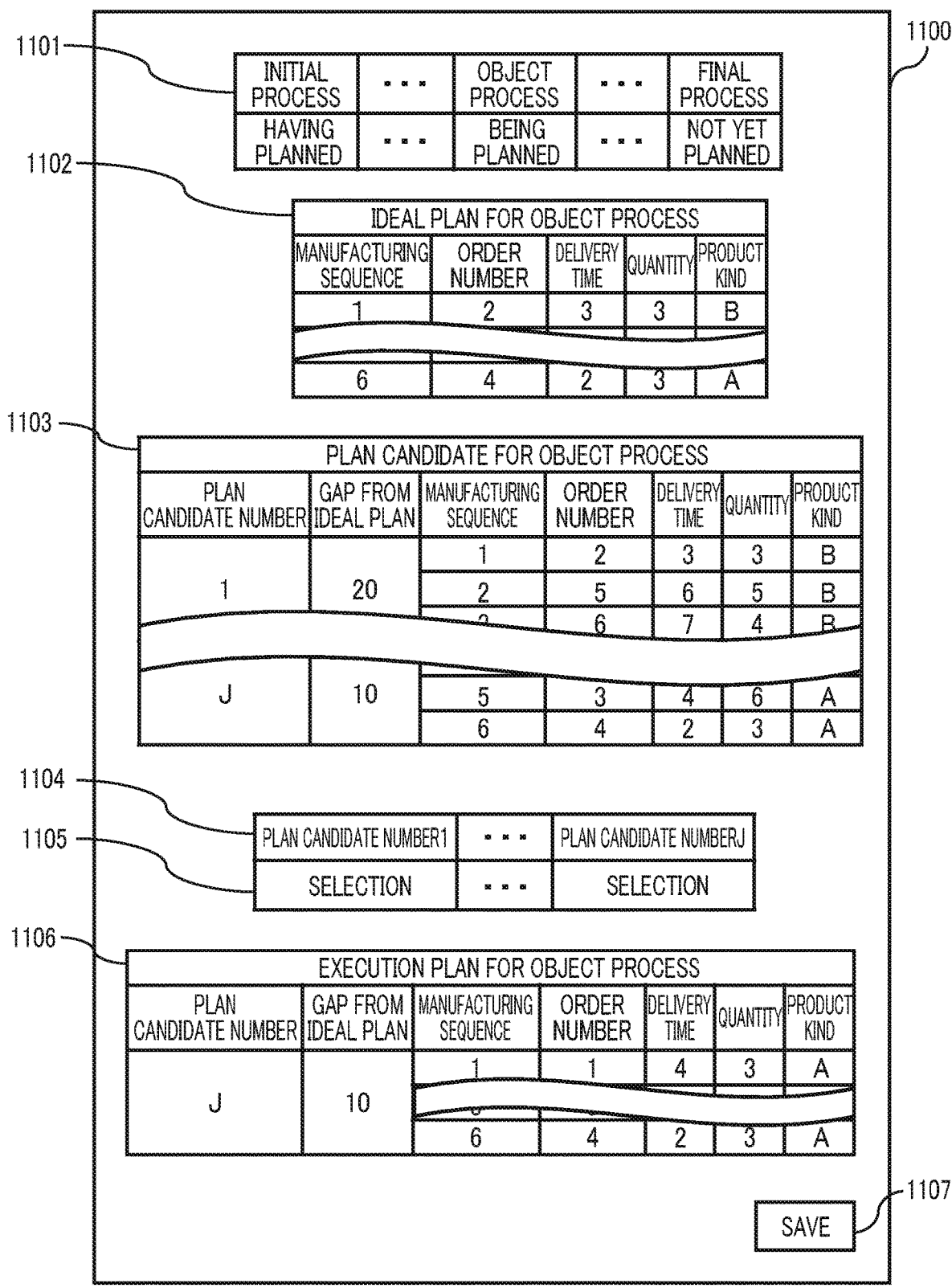
FIG. 15 illustrates an exemplary execution plan generation support screen.

FIG. 15 illustrates an example of screens that are displayed when an execution plan is to be created (hereinafter, referred to as an execution plan generation support screen) among screens displayed on the terminal 109 for operator. The execution plan generation support screen is displayed, for example, when the creation of an ideal plan is started.

As illustrated in FIG. 15, an execution plan generation support screen 1100 is equipped with each of columns of a plan situation display box 1101, an ideal plan display box 1102, a plan candidate display box 1103, a plan candidate selection box 1104, a plan candidate selection button 1105, an execution plan display box 1106 and a save button 1107.

To the plan situation display box 1101, there is output information that shows each of a process in which the creation of an ideal plan has been finished, a process in which an ideal plan is being created, and a process in which an ideal plan has not been created yet. To the ideal plan display box 1102, information on a process in which an ideal plan is being created is output. To the plan candidate display box 1103, information on plan candidates of a process that are being created is output. The plan candidate selection box 1104 and the plan candidate selection button 1105 display plan candidates and receive the selection of a plan candidate. To the execution plan display box 1106, information on the plan candidate having been selected by the plan candidate selection box 1104 (that is, the execution plan) is output. The save button 1107 receives an instruction for storage of information on the execution plan selected by the execution plan display box 1106. When the storage has been received, the execution plan is memorized in the execution plan DB 111.

Next, details of each processing in the production support processing will be described.

<Calculation Start Process Information Generation Processing S1203>

Figure 16:
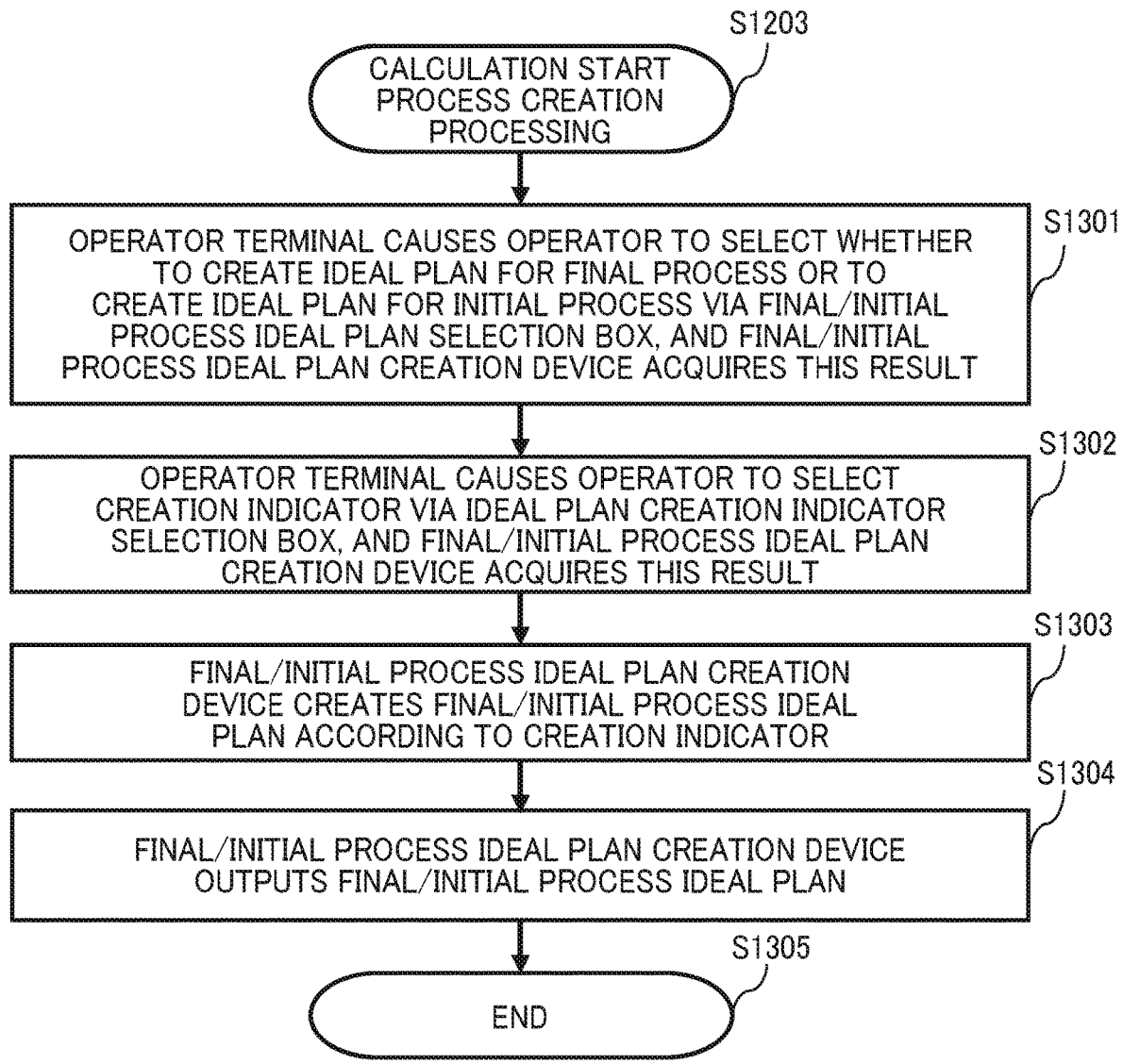
FIG. 16 illustrates a flow chart describing details of calculation start process information generation processing.

FIG. 16 illustrates a flow chart describing details of calculation start process information generation processing. As illustrated in FIG. 16, first, the terminal 109 for operator receives the selection of a basis (whether the initial process is to be set as a calculation start process or the final process is to be set as a calculation start process) when calculation start process information is to be calculated, via the final/initial process ideal plan selection box 1003, and the final/initial process ideal plan creation device 104 acquires the content of the received selection.

Further, the final/initial process ideal plan creation device 104 determines indicators when an ideal plan is to be created (S1302). Concretely, the terminal 109 for operator receives the selection for the ideal plan creation indicator selection box 1005 from a user, and the final/initial process ideal plan creation device 104 acquires the content of the received selection. Meanwhile, in the present embodiment, the indicator includes an indicator for creating an ideal plan that gives an early delivery time or an indicator for creating an ideal plan that gives a large production quantity, and indicators obtained by attaching a prescribed weight to these indicators may be used.

The final/initial process ideal plan creation device 104 generates calculation start process information on the basis of the calculation start process acquired in S1301 and the indicator acquired in S1302 (S1303). Concretely, for example, in a case where the indicator is a delivery time and the calculation start process is a final process, the final/initial process ideal plan creation device 104 generates at least one calculation start process information so as to give earlier delivery time of the product on the basis of an information processing program having a general calculation function and sort function. Further, in a case where the indicator is a production quantity and the calculation start process is an initial process, the final/initial process ideal plan creation device 104 generates at least one calculation start process information so as to give a larger production quantity of the product on the basis of an information processing program having a general calculation function and sort function.

Then, the final/initial process ideal plan creation device 104 outputs the calculation start process information generated in S1303 (S1304). Thus, calculation start process information generation processing finishes (S1305).

<Ideal Plan Creation Processing S1204>

Next, ideal plan creation processing will be described in detail.

Figure 17:
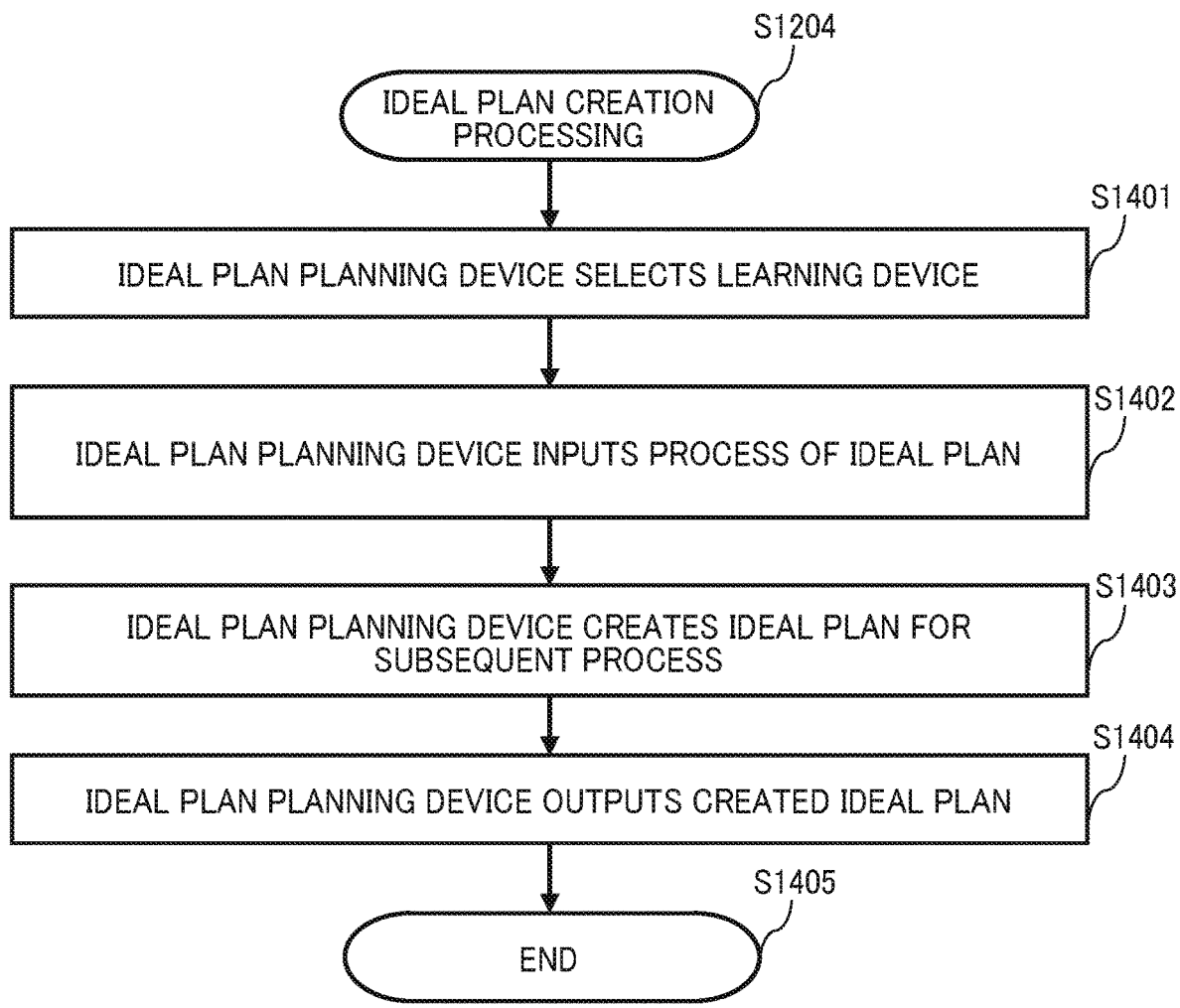
FIG. 17 illustrates a flow chart describing details of ideal plan creation processing.

FIG. 17 illustrates a flow chart describing details of ideal plan creation processing. As illustrated in FIG. 17, the ideal plan planning device 105 selects a learning device by the learning system selection unit 201 (S1401). That is, the ideal plan planning device 105 selects a learning device that works in the backward direction when a final process is selected as a calculation start process in calculation start process information generation processing. The ideal plan planning device 105 selects a learning device that works in the forward direction when an initial process is selected as a calculation start process in calculation start process information generation processing.

The ideal plan planning device 105 inputs an ideal plan (S1402). For example, the ideal plan planning device 105 inputs a final process ideal plan when a final process is selected as a calculation start process in calculation start process information generation processing. Further, the ideal plan planning device 105 inputs an initial process ideal plan when an initial process is selected as a calculation start process in calculation start process information generation processing.

The ideal plan planning device 105 creates an ideal plan for a subsequent process on the basis of the ideal plan having been input in S1402 (S1403). For example, the ideal plan planning device 105 creates an ideal plan for a process preceding the final process when the final process is selected as a calculation start process in calculation start process information generation processing. Further, the ideal plan planning device 105 creates an ideal plan for a process succeeding the initial process when the initial process is selected as a calculation start process in calculation start process information generation processing.

Then, the ideal plan planning device 105 outputs the ideal plan created in S1403 (S1404). Processing in S1402 and S1403 is repeated until ideal plans are created for all processes.

In order to create an ideal plan, for example, a neural network learning device and backpropagation are used. As details of the neural network learning device and backpropagation, for example, the method described in Zheng et al, "Car-following behavior with instantaneous driver-vehicle reaction delay: A neural-network-based methodology" Transportation Research Part C 36, 339-351 (2013) can be used.

Input to the learning input processing unit 202 is, for example, information on a delivery time, quantity and kind of each of products, and information that is output by a learning output processing unit 203 is, for example, a production sequence of each of products (sequence according to which an order lot is introduced into facilities in respective processes). With respect to a manufacturing sequence configured by discrete values, probability at which each production sequence is selected is calculated, and the sequence is determined in descending order of calculated probabilities. Further, number of hierarchies in a neural network learning device is set, for example, to be three and neuro number of each of hierarchies is set, for example, to be 3 for a first hierarchy, 10 for a second hierarchy, and 1 for a third hierarchy. Furthermore, as an activation function between hierarchies, for example, a sigmoid function is utilized.

Meanwhile, for these calculations, generally available machine learning software can also be used. Further, in the above, concrete numerals, item names and function names are mentioned as information on input/output, but other numeral values, item names, function names and the like may be used.

The ideal plan planning device 105 outputs ideal plans for respective processes generated in S1402 and S1403 to the ideal plan DB 107 (S1404). This is the end of the ideal plan creation processing (S1405).

<Plan Candidate Creation Processing S1207>

Next, plan candidate creation processing will be described in detail.

Figure 18:
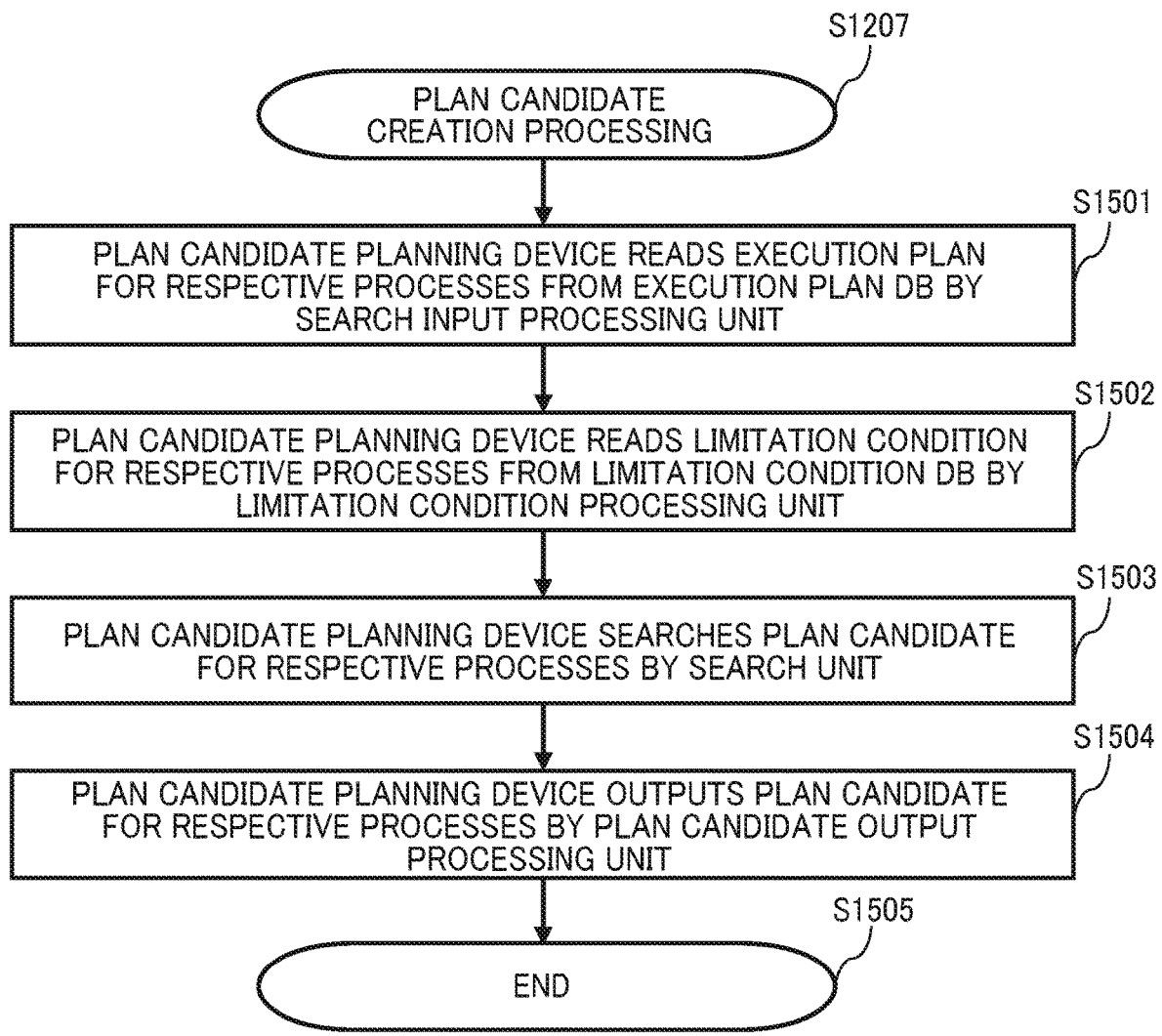
FIG. 18 illustrates a flow chart describing details of plan candidate creation processing.

FIG. 18 illustrates a flow chart describing details of plan candidate creation processing. As illustrated in FIG. 18, the plan candidate planning device 106 reads an execution plan for each of processes from the execution plan DB 111 by the search input processing unit 301 (S1501).

Concretely, in a case where an ideal plan is created by a learning device that works in a backward direction in ideal plan creation processing, the plan candidate planning device 106 acquires an execution plan for each of processes in the backward direction from the initial process by the search input processing unit 301. On the other hand, in a case where an ideal plan is created in a learning device that works in a forward direction in ideal plan creation processing, the plan candidate planning device 106 acquires an execution plan for each of processes in the backward direction from the final process by the search input processing unit 301.

Further, the plan candidate planning device 106 reads limitation condition information on each of processes from the limitation condition DB 102 by the limitation condition input processing unit 302 (S1502).

The plan candidate planning device 106 creates (searches) a plan candidate for each of processes by the search unit 303 (S1503).

The search method is carried out, for example, on the basis of limitation programming. In this case, information that is input by the limitation condition input processing unit 302 is, for example, a delivery time, quantity or product kind of an order of a product, production sequence of the product, or limitation conditions in each of processes. Information that is output is, for example, manufacturing sequence of a product in each of processes, satisfying limitation conditions in each of processes. Search algorithm adopts, for example, a search technique referred to as backtracking. Meanwhile, the backtracking is one of general solution search algorithms, which is a technique that, when a solution is to be obtained, a procedure that may give the solution is tried and, in a case where the solution is finally obtained by the tried procedure, the obtained solution is stored, but in a case where it becomes clear that a solution cannot be obtained by the tried procedure, the state is returned to one previous state at the time when it has become clear and another procedure is tried. In the backtracking search method, a plurality of solutions can be searched.

The search is carried out, for example, using $$D_i = (KN_i - LN_i)^2 + (KS_i - LS_i)^2 + (KH_i - LH_i)^2 \quad \text{[Formula 1]}$$

-continued $$KH_i - LH_i = \begin{cases} 0 & \text{if } KH_i = LH_i \\ 1, & \text{otherwise} \end{cases} \quad \text{[Formula 2]}$$

$$D = \sum_{i=1}^{N} Di \quad \text{[Formula 3]}$$

to calculate a distance between solutions.

Then, a solution keeping a certain distance is adopted as a plan candidate. For example, in a case where "a solution 1" has been searched and then "a solution 2" is searched, when a distance between "the solution 2" and "the solution 1" is larger than distance X having previously been set, "the solution 2" is adopted as a plan candidate.

Meanwhile, for the above calculation, generally available mathematical programming software may be used. Further, in the present embodiment, as information that is input/output, concrete numeral values, item names and limitation conditions are mentioned, but other numerical values, item names, limitation conditions and the like may be used.

Next, the plan candidate planning device 106 outputs a plan candidate for each of processes by the plan candidate output unit 304 (S1504). This is the end of plan candidate creation processing (S1505).

<Learning Processing S1212>

Next, learning processing will be described in detail.

Figure 19:
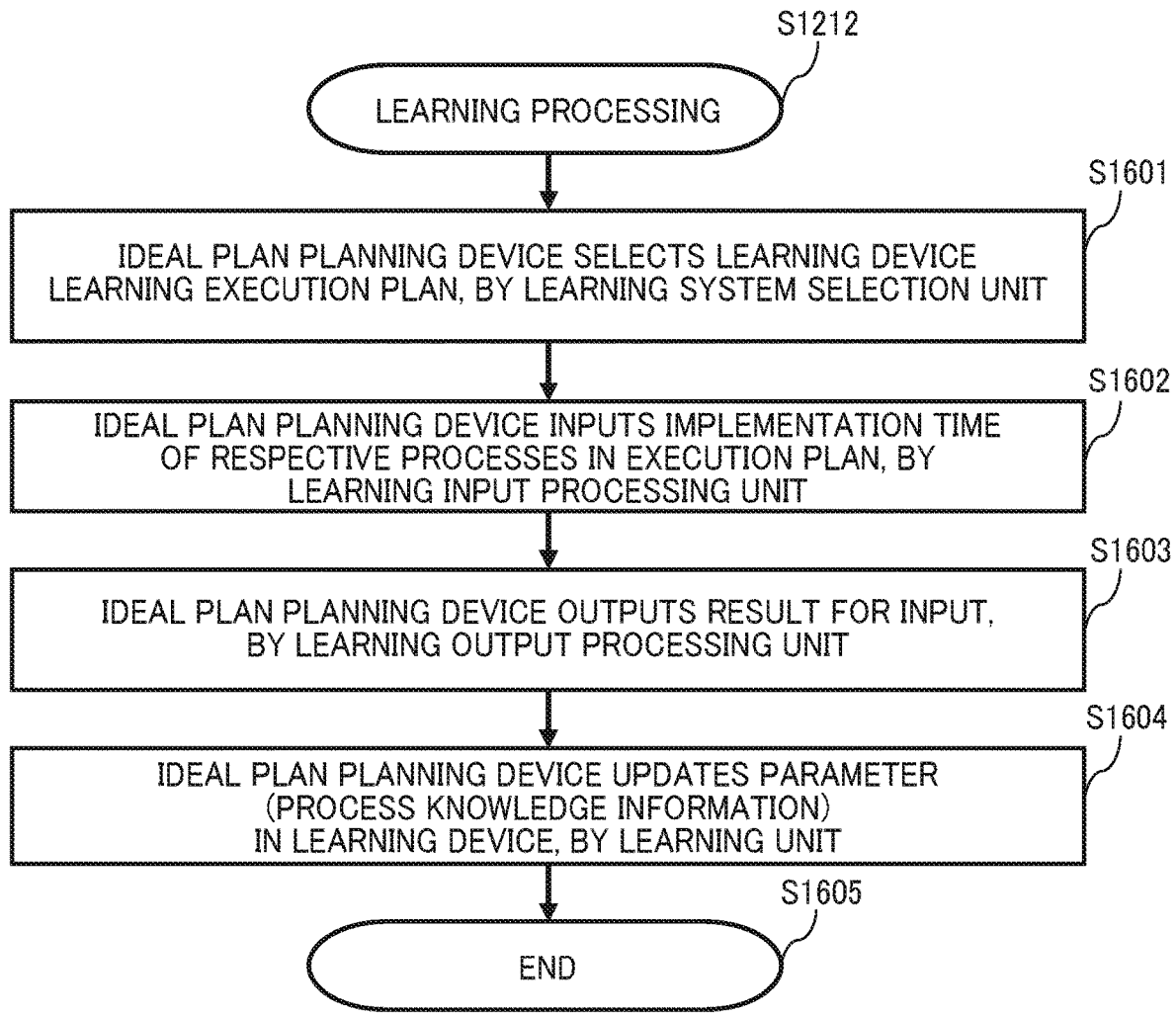
FIG. 19 illustrates a flow chart describing details of learning processing.

FIG. 19 illustrates a flow chart describing details of learning processing. As illustrated in FIG. 19, the ideal plan planning device 105 first selects a learning device by the learning system selection unit 201 (S1601).

Concretely, the ideal plan planning device 105 selects a backward direction learning device in a case where a calculation start process is a final process in calculation start process information generation processing. Further, the ideal plan planning device 105 selects a forward direction learning device when a calculation start process is an initial process in calculation start process information generation processing.

The ideal plan planning device 105 reads an execution plan from the execution plan DB 111 by the learning input processing unit 202, and inputs each of processes in the read execution plan to a learning device (S1602). Concretely, the ideal plan planning device 105 inputs a calculation start process selected by calculation start process information generation processing to a learning device.

Then, the ideal plan planning device 105 outputs an execution plan for a subsequent process (a process in the forward direction or a process in the backward direction) on the basis of the execution plan having been input to the learning device by the learning output processing unit 204 (S1603). The processing is repeated sequentially.

The ideal plan planning device 105 updates the process knowledge DB 112 on the basis of the execution plan generated in S1602 and S1603 (an execution plan in which the implementation time in all processes has been specified). That is, the ideal plan planning device 105 learns the execution plan by the learning unit 203.

As to the input/output in the learning, for example, when a neural network learning device is used, the delivery time, quantity and kind of a product in a calculation start process are set as inputs in an input layer, and manufacturing sequence of the product in each of the other processes is set as an output in an output layer. Further, the learning method updates parameters of a neural network, for example, by using backpropagation.

Meanwhile, when the learning device learns first, a user has previously input prescribed information on each of processes and the implementation time of each of processes having been carried out in the past (execution plan history) to an input layer and an output layer, and on the basis of the information, parameters of a neural network may have been updated using backpropagation.

This is the end of the learning processing (S1605).

As described above, with the production plan support system 1 of the present embodiment, implementation process information being information on the implementation time of an ordered product in each of processes is generated on the basis of process knowledge information, and implementable process information being information on the implementation time in each of processes, satisfying limitation conditions for each of processes, is generated by a mathematical plan technique, further, process knowledge information is updated on the basis of implementable process information, and implementable process information is output as a production plan of a product. Therefore, users such as operators can suitably carry out production of a product to be produced by implementing a plurality of processes. That is, with the production plan support system 1 of the present embodiment, machine learning in which process knowledge information is updated on the basis of implementable process information is carried out, and therefore a production can be carried out, for example, on the basis of a production plan of a product having been carried out by a person who is skilled in the production of the product. Consequently, a user can carry out production considering factors, such as restart cost of facilities used in each of processes, for which skilled experience and knowledge are required with respect to the production of the product, and therefore can produce the product effectively with low cost. Further, even when limitation conditions such as production capacity or quantity of a product exist for each of processes, a user can carry out suitable production that satisfies these limitation conditions.

For example, with the production plan support system 1 of the present embodiment, a plurality of implementable process information is generated as implementable process information, satisfying usage conditions of facilities, and therefore a user can produce a product on the basis of a suitable production plan corresponding to conditions of various facilities for use in the production of the product.

Further, with the production plan support system 1 of the present embodiment, similarity between each of the plurality of generated implementable process information and implementation process information is calculated, implementable process information that is the most similar to the implementation process information among the calculated similarities is specified, and the specified implementable process information is output as information on a production process of a product, and therefore a user can carry out production on the basis of a production plan that makes the most suitable production of a product possible, among executable production plans for the product.

Further, with the production plan support system 1 of the present embodiment, implementation process information is generated according to indicators when implementation process information is generated, and therefore a user can produce a product along a prescribed goal.

For example, with the production plan support system 1 of the present embodiment, information on a quantity of a product or a production completion time of a product is acquired as an indicator when implementation process information is generated and implementation process information is generated according to the acquired indicator, and therefore a user can surely produce a product on the basis of a production plan for producing the product in a prescribed quantity or a production plan for completing the production of the product by a prescribed delivery time.

Further, with the production plan support system 1 of the present embodiment, process knowledge information is updated by generating, on the basis of information on a process, information that specifies the implementation time of the preceding process, or learning is carried out by updating process knowledge information by generating, on the basis of information on a process, information that specifies an implementation time of the process to be implemented subsequently, and therefore a user can produce a product whose production quantity is the largest at the production start time of the product, or can produce a product whose final in-process inventory is to be reduced.

Hereinbefore, as embodiments of the present invention, examples in which the present invention is applied to support a production plan of a product have been described. Meanwhile, the present invention is not limited to the above-described embodiments, but various modified examples are included. For example, the above-described embodiments have been described in detail in order to clearly explain the present invention, and the present invention is not necessarily limited to the embodiment including all the components described. Further, a part of component of an embodiment can be replaced with a component of another embodiment, and a component of another embodiment can also be added to a component of an embodiment. Furthermore, a part of the components of each of the embodiments can be added with other components, be deleted, or be replaced with other components.

For example, the present invention can be applied not only to businesses of manufacturing goods (manufacturing industries) but also to businesses such as other types of businesses in which the business is carried out by a plurality of processes (for example, a decision-making business that is carried out via a plurality of processes, and the like).

Further, a part or all of the above-described respective components, functions, processors, processing means and the like, may be implemented in hardware, for example, by design with an integrated circuit or the like. In addition, the above-described respective components, functions and the like may be implemented in software in which a processor interprets and executes programs that realize the respective functions. The information such as a program, a table or a file, for realizing the respective functions, can be placed on a recording device such as a memory, a hard disk or a solid state drive (SSD), or a recording medium such as an IC card, an SD card or a DVD.

Further, the control lines and information lines considered to be required for the purpose of description are shown, and not all control lines or information lines are shown from the viewpoint of a product. It may also be considered that actually almost all components are connected to each other.

What is claimed is:

1. A production support system to support production of a product to be produced by implementing a plurality of processes, the system comprising:
   at least one processor; and
   at least one memory storing instructions that, when executed by the at least one processor, cause the at least one processor to execute:
   an initial plan creation unit configured to create an initial plan of the respective processes in a first process order based on process knowledge information of a relationship between the product and implementation times of each of the respective processes and on a predetermined indicator, the initial plan being created using one of an initial process or a final process of the plurality of processes as a calculation start process;
   a plan candidate planning unit configured to create a plurality of plan candidates of the respective processes in an order opposite to the first process order based on a limitation condition being a limitation or condition which imposes on the respective processes;
   a plan candidate selection unit configured to calculate respective similarities between the initial plan and each of the plurality of the plan candidates and to select the plan candidate having a highest similarity to the initial plan as an implementation plan; and
   an initial plan planning device including:
   a learning unit that includes first and second learning devices, the first learning device configured to use a respective machine learning technology in which the final process is an input and the initial process is an output, the second learning device configured to use a respective machine learning technology in which the initial process is an input and the final process is an output, and
   a learning system selection unit configured to select the first learning device, as a selected learning device, in the case where the calculation start process is the final process and to select the second learning device, as the selected learning device, in the case where the calculation start process is the initial process,
   wherein the learning unit is further configured to update the process knowledge information based on the selected implementation plan and the calculation start process according to the selected learning device.

2. The production support system according to claim 1, wherein:
   the initial plan creation unit creates the initial plan of the respective processes in the first process order from the initial process, as the calculation start process, to the final process and in which the initial plan of a post-process is created based on the initial plan of a pre-process; and
   the plan candidate planning unit creates the plurality of the plan candidates of the respective processes in the order opposite to the first process order in which the plan candidate of a pre-process is created based on the plan candidate of a post-process.

3. The production support system according to claim 1, wherein:
   the initial plan creation unit creates the initial plan of the respective processes in the first process order from the final process, as the calculation start process, to the initial process and in which the initial plan of a pre-process is created based on the initial plan of a post-process;
   the plan candidate planning unit creates the plurality of the plan candidates of the respective processes in the order opposite to the first process order in which the plan candidate of a post-process is created based on the plan candidate of a pre-process.

4. The production support system according to claim 1, wherein:
   the plan candidate selection unit selects the plan candidate having the highest similarity to the initial plan as the implementation plan based on externally input information.

5. The production support system according to claim 1, wherein:
the initial plan creation unit is further configured to create the initial plan based on an order information of the product to be produced.

6. The production support system according to claim 1, further comprising:
an initial plan database (DB) storing the initial plan of each of the processes; and
a plan candidate DB storing the plan candidates of each of the processes.

7. The production support system according to claim 1, wherein:
the predetermined indicator is information on a quantity of the product or a production completion time of the product.

8. A production support method for supporting production of a product to be produced by implementing a plurality of processes, the method being executed by at least one processor and comprising:
creating an initial plan of the respective processes in a first process order based on process knowledge information being a relationship between the product and an implementation time of the respective processes and on a predetermined indicator, the initial plan being created using one of an initial process or a final process of the plurality of processes as a calculation start process;
creating a plurality of plan candidates of the respective processes in an order opposite to the first process order based on a limitation condition being a limitation or condition which imposes on the respective processes;
calculating respective similarities between the initial plan and each of the plurality of the plan candidates and selecting the plan candidate having a high similarity to the initial plan as an implementation plan;
selecting one of first or second learning devices, the first learning device configured to use a respective machine learning technology in which the final process is an input and the initial process is an output, the second learning device configured to use a respective machine learning technology in which the initial process is an input and the final process is an output, based on the calculation start process; and
updating the process knowledge information based on the selected implementation plan and the calculation start process according to the respective machine learning technology of the selected learning device,
wherein the first learning device is the selected learning device in the case where the calculation start process is the final process, and the second learning device is the selected learning device in the case where the calculation start process is the initial process.

9. The production support method according to claim 8, wherein:
the initial plan of the respective processes in the first process order from the initial process, as the calculation start process, to the final process and in which the initial plan of a post-process is created is created based on the initial plan of a pre-process; and
the plurality of the plan candidates of the respective processes in the order opposite to the first process order in which the plan candidate of a pre-process is created is created based on the plan candidate of a post-process.

10. The production support method according to claim 8, wherein:
the initial plan of the respective processes in the first process order from the final process, as the calculation start process, to the initial process and in which the initial plan of a pre-process is created is created based on the initial plan of a post-process; and
the plurality of the plan candidates of the respective processes in the order opposite to the first process order in which the plan candidate of a post-process is created is created based on the plan candidate of a pre-process.

11. The production support method according to claim 8, wherein:
the plan candidate having the highest similarity to the initial plan as the implementation plan is selected based on externally input information.

12. The production support method according to claim 8, wherein:
the initial plan is created based on order information of the product to be produced.

13. The production support method according to claim 8, wherein:
an initial plan database (DB) stores the initial plan of each of the processes; and
a plan candidate DB stores the plan candidates of each of the processes.

14. The production support method according to claim 8, wherein:
the predetermined indicator is information on a quantity of the product or a production completion time of the product.

* * * * *